April 19, 1932. W. G. WILSON 1,854,359
ACTUATION OF BRAKE BANDS, REACTION BANDS FOR EPICYCLIC
GEARING, OR ANY LEVER ACTUATION OF PARTS
Filed Oct. 28, 1929 6 Sheets-Sheet 6

W. G. Wilson
INVENTOR

By Marks+Clerk
Attys.

Patented Apr. 19, 1932

1,854,359

UNITED STATES PATENT OFFICE

WALTER GORDON WILSON, OF LONDON, ENGLAND

ACTUATION OF BRAKE BANDS, REACTION BANDS FOR EPICYCLIC GEARING, OR ANY LEVER ACTUATION OF PARTS

Application filed October 28, 1929, Serial No. 403,100, and in Great Britain November 3, 1928.

This invention relates to the actuation or control of brake bands, reaction bands for epicyclic gearing or any lever actuation of parts.

In a case in which the invention is applied to the manipulation of the various reaction bands in a mechanically operated epicyclic gear box of an automobile, they are selectively applied or tightened preferably by toggle and strut mechanism through the medium of a bus bar which lies on a knife edge on the bottom of the gear box, and which is so arranged that when in the down position the reaction bands are all free, and in the up position one selected band is applied. Arranged on one end of the bus bar, a bracket is provided in such a way that the depression of a foot pedal by the driver pushes the bar down, and on allowing the pedal to rise, the bus bar is pushed upwards by means of a spring or springs, this movement tightening the band and engaging the selected gear.

The object of the present invention is to obtain varying characteristics from such spring or springs, which can be either in compression or under tension, such that it is adapted to act at varying leverage moments about the working axis of the bus bar.

The invention consists in a lever actuating system working in conjunction with a spring or springs in which as the spring is progressively stressed by the action of the lever so the resistance to the movement of such lever progressively decreases.

The invention further consists in a lever actuating system working in conjunction with a spring or springs in which the leverage moment varies in inverse ratio to the stress on the spring.

The invention also consists in the lever actuating system hereinafter described.

The invention will now be described with reference to the accompanying drawings, in which Figure 1 shows a sectional elevation of the improved lever reaction control, in the position in which the spring is under full compression and the actuating pedal is in its downward position.

Figure 9:
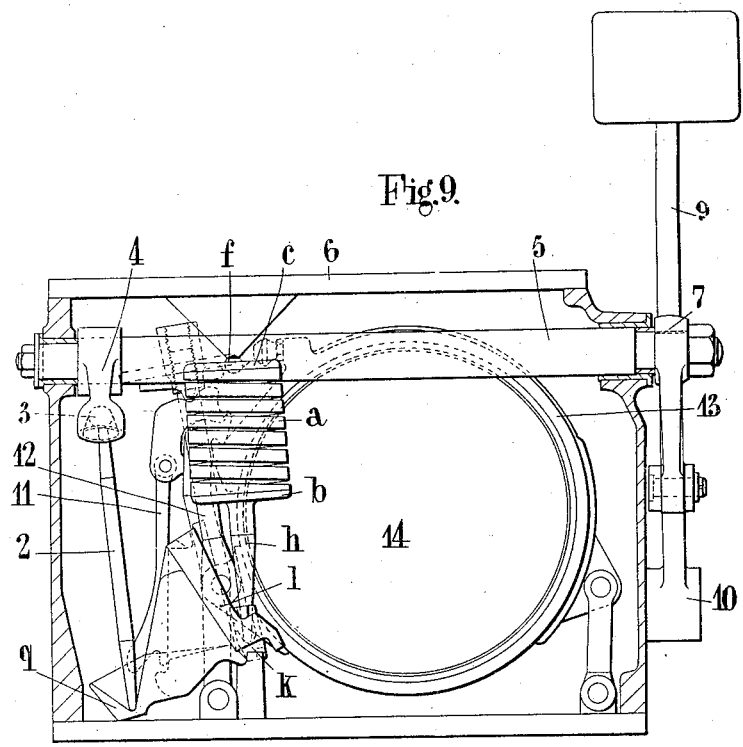
Figure 10:
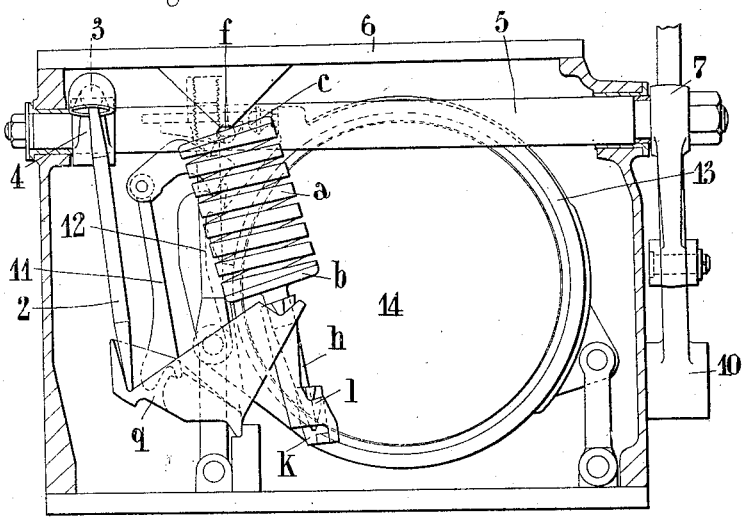
Figure 11:
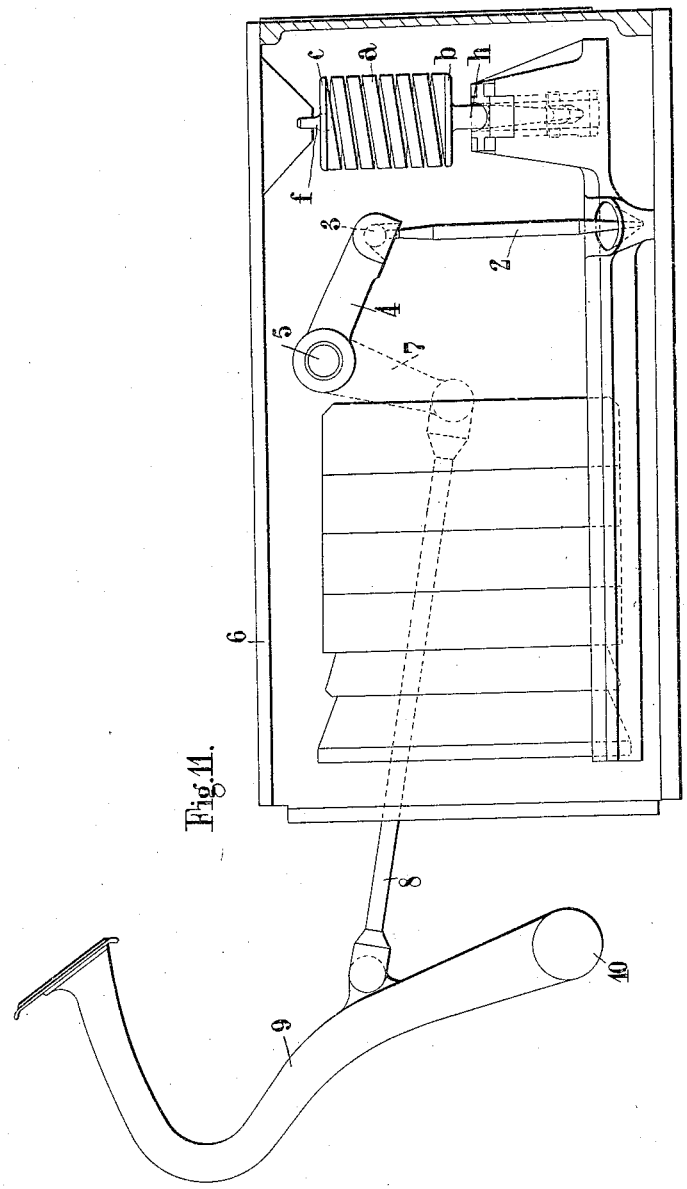
Figure 12:
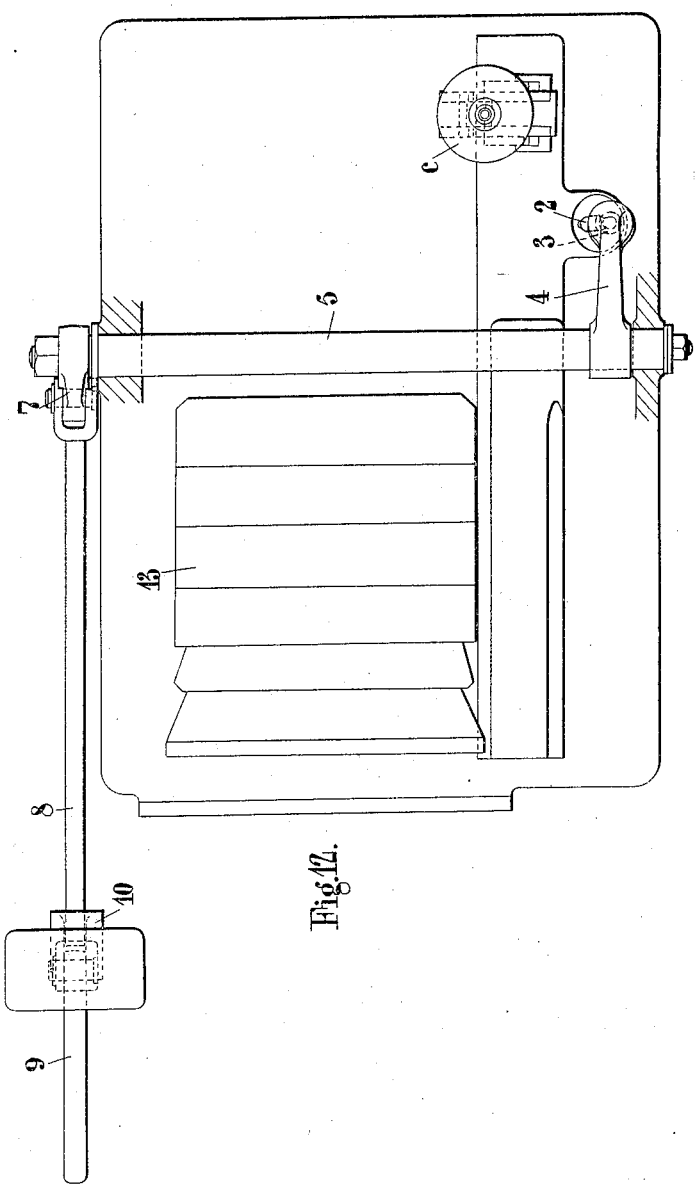

Figures 9, 10, 11 and 12 show the improved reaction band control applied to an epicyclic change speed gear, Figures 9 and 10 being end elevations showing two positions of the gear and Figures 11 and 12 front elevation and plan view respectively.

Figure 1:
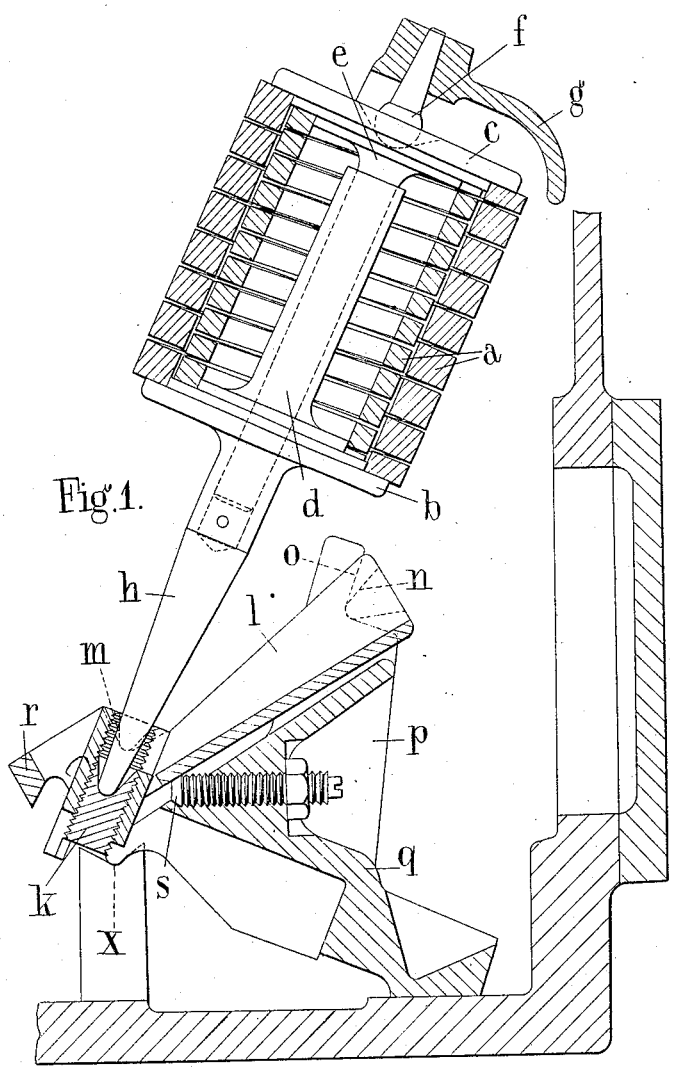
Figure 2:
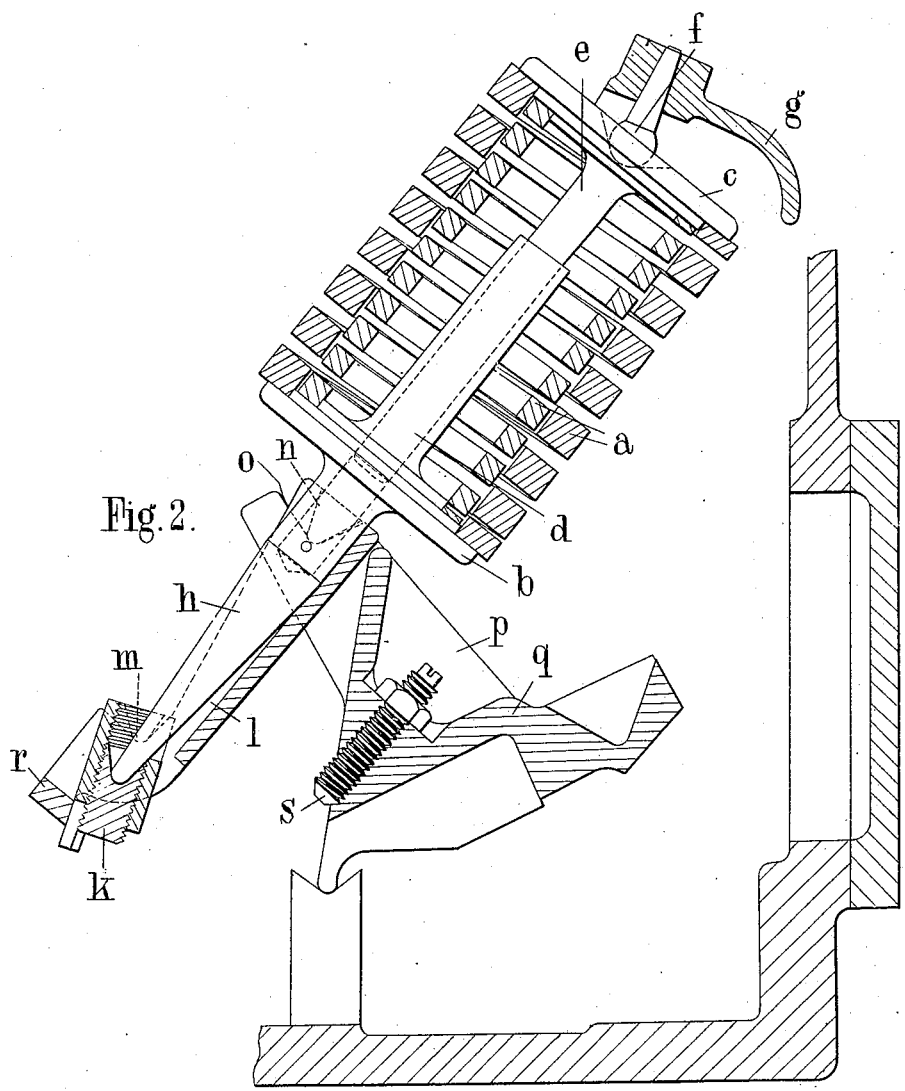
Figure 2 is a similar view to that of Figure 1 with the parts in the position with the actuating pedal in its raised position.

In carrying the invention into effect, and referring to Figures 1 and 2, a compression spring or springs $a$ is or are used (two being shown) mounted between a pair of plates $b$, $c$ having centre stems $d$, $e$ that telescope on one another. One plate $c$ abuts at its centre against a fixed ball-shaped projection $f$ on the rigid framework $g$ of the gear box, whilst the other plate has a ball ended centre finger $h$ that is seated in an inner bucket-shaped socket which is free to oscillate relatively to the centre finger in one plane.

This inner bucket $k$ lies within an outer bucket $l$ and is carried by means of trunnions or knife edge bearings $m$ positioned between the springs themselves and the end of the finger $h$ so that the force of the springs tends to keep the inner bucket in position within the outer, its travel being limited by stops.

The outer bucket $l$ is itself fitted with a knife edge $n$ that engages in a corresponding socket $o$ provided in a bracket arm $p$ integral with or attached to the bus bar $q$ so called by reason of the fact that it is common to and operates the several gear elements. To control the movements of the inner and outer bucket members stops such as $r$ and $s$ are provided; the stop $r$ on the outer bucket being adapted to limit the swinging movement allowed to the inner bucket, and the stop $s$ being provided to have a similar effect on the outer bucket. In this way, the springs $a$ as hereafter described are allowed to extend by the pedal release of the bus bar $q$, the buckets swinging relatively to the bracket in such a way that the leverage moment is increased. Similarly, when the bus bar is pedal actuated the leverage is decreased, so that although at the lower part of the travel of the bus bar the spring is compressed to its fullest extent, the torque exerted on the bus bar is at a minimum due to the small radius or leverage at which the spring is working. This will now be explained with reference to the diagrammatic Figures 3 to 7.

According to the example being described as applied to the control of an epicyclic change speed gear, it is necessary to note that in order to keep the gear engaged when the foot is lifted off the clutch pedal the described reaction springs work on varying leverage moments.

In order to understand the operation, it is necessary to consider what characteristics of reaction are required. It is plain, that the greatest torque on the bus bar $q$ is needed when the gear is fully engaged, and therefore, when the springs $a$ are extended, but it is also necessary that the resistance offered by the actuating pedal to the foot of the driver should fall away at the bottom or the end of the movement, so that it will be easy to depress the pedal to its fullest extent and so make sure of effecting the desired change of gear. This easy operation of the pedal movement is, however, to take place when the spring is fully compressed, and therefore, in order to get this contradictory resistance curve, the spring is made to work on varying leverages, and the method of obtaining these will now be described.

Figure 3:
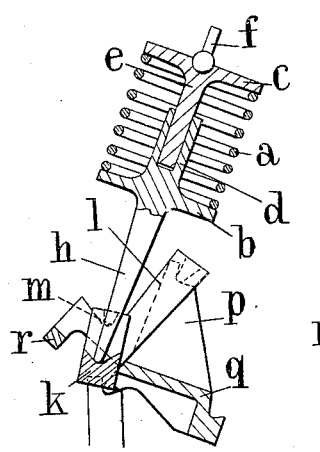
Figures 3 to 7 are diagrammatic views showing five positions of the parts.
Figure 4:
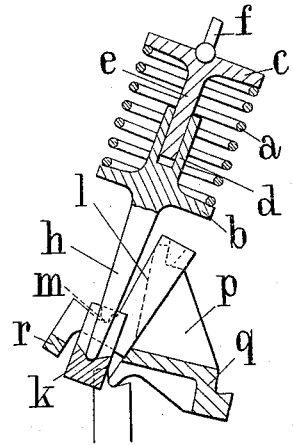
Figure 5:
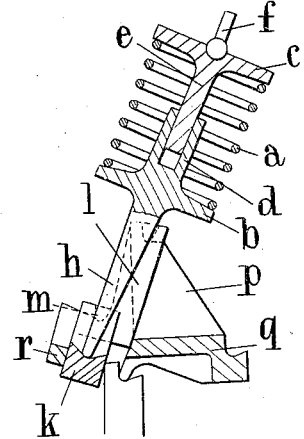

Referring to Figure 3, the force of the springs $a$, which are in compression, is restrained by the two plates $b$, $c$, fitted with pins $d$, $e$ one sliding within the other, as above described. When the bus bar is down, Figure 3, that is to say, the pedal depressed and the gears free, the spring is fully compressed and the outer bucket $l$ is lying against stop $s$ provided on the bus bar and the inner bucket is just restrained by the bus bar. The centre axis of the spring and the finger $h$ will come very close to the axis $x$ of the bus bar, so that the turning moment which is tending to raise the bus bar is very small, though the load on the spring is at its maximum. Now, as the foot is raised, the spring $a$ tends to push the bus bar up, starting to apply the gear. As it does so, the inner bucket $k$ moves towards the centre of the gear box through the position shown in Figure 4 until it finally touches the stop $r$ on the outer bucket, Figure 5. The further movement of the pedal now continuing, the springs are still extending and raising the bus bar $q$ through the medium of the outer bucket, the leverage moment of the spring about the axis of the bus bar still steadily increasing.

Figure 6:
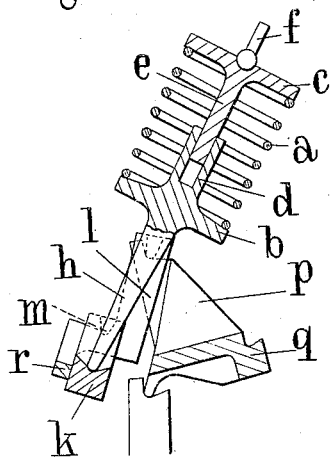
Figure 7:
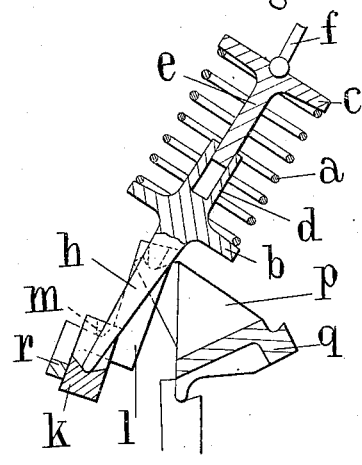

There is, however, a moment during this action when the ball shaped projection $f$, the trunnions $n$ of the outer bucket and the centre of the finger $h$ come into line, see Figure 6. At this point, the whole of the outer bucket $l$ swings away from its stop giving a rapidly increasing torque, and by now the spring is almost completely extended, see Figure 7.

Figure 8:
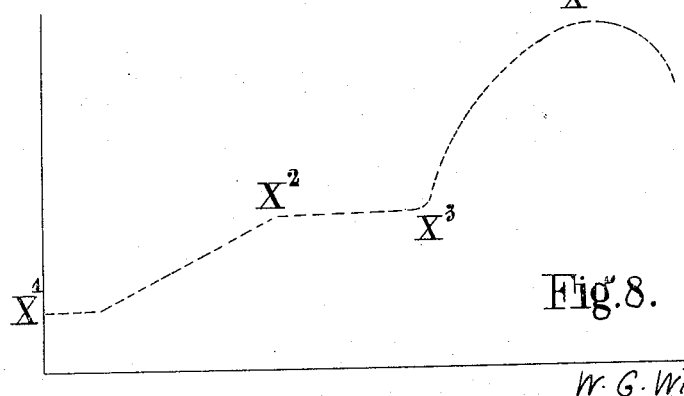
Figure 8 is a graph or curve resulting from the movement of the bus bar.

The result of the interaction of the parts described produces a stress curve on the spring, which is illustrated in Figure 8, and on reference to this figure, it will be seen that instead of a regular stress line which a spring usually provides, the arrangement hereinbefore described produces the irregular curve illustrated. At the commencement of the action of the lever, the first part of the curve starting from the point $x'$, the inner bucket will be resting against the inner stop $s'$. From this point up to the point $x^2$ the inner bucket is swinging free on the outer bucket and at the point $x^3$ is locked against the outer stop $r$. From point $x^2$ to point $x^3$ there is no substantial increase in the stress until the outer bucket $l$ starts to swing. From $x^3$ the stress rapidly rises to about the position $x^4$ where the spring pressure commences to fall.

Such stress curve may be modified as desired by varying the distances between the knife edge supports and their angles of intersection.

Referring now to Figures 9, 10, 11 and 12, in which the improved reaction band control above described is shown applied to an epicyclic change speed gear, the bracket arm $p$ of the bus bar $q$ has pivotally mounted thereon a strut 2 which is connected at its upper end by means of a ball joint 3, to a lever arm 4 which is fixed on one end of a rod 5 rotatably mounted in the gear box casing 6. The other end of the rod 5 extends through the gear box casing 6 and has fixed thereto another lever arm 7 which is connected by a link rod 8 to the pedal lever 9 pivoted at 10 to a fixed part of the frame (not shown).

The bracket arm $p$ is adapted to also pivotally support a strut 11 which in turn is pivotally connected at its upper end to a toggle lever mechanism 12 adapted to actuate the brake band element 13 on the reaction drum 14.

When the pedal lever 9 is pushed down, it swings about its pivot 10 and exerts a pull on the link rod 8 which in turn rotates the rod 5 in a clockwise direction (as viewed in Figure 11) through the medium of the lever arm 7, this movement of the rod 5 being imparted to the other lever arm 4 pivotally connected to the strut 2. The clockwise movement of the lever arm 4 imparts a downward movement to the strut 2 which latter, through its pivotal connection with the bracket arm $p$ pushes down the bus bar $q$ whereby the reaction band control and toggle lever mechanisms are caused to assume the out of gear position shown in Figures 9, 11 and 12.

Upon releasing the pressure on the pedal lever 9 the bus bar $q$ returns to its upper position under the action of the spring *a*, thus causing the strut 2 to move upwardly and impart a counter-clockwise movement to the lever arm 4, rod 5 and lever arm 7, (as viewed in Figure 11), thus returning the pedal lever to its upper position.

The bus bar *q* during its upward movement also engages with the strut 11 which latter is accordingly raised to actuate the toggle lever mechanism and apply the brake. This position is shown in Figure 10.

As will be seen from Figure 12, the bus bar *q* extends along the full length of the gear box so as to be able to actuate the toggle lever mechanism of any gear element selected.

From the foregoing it is to be understood that, contrary to the usual practice where the movement of a lever whether by pedal or otherwise causes an increasing resistance, in this case the resistance becomes progressively smaller, which amongst other things will ensure that the full stroke of the lever is secured, since the operator when missing the resistance continues to press on the lever till it comes against the usual limiting stop.

The spring may be arranged in any other way than that described and more than one spring may be used. The scope of the invention is not necessarily confined to epicyclic gear; it may be used for ordinary brake actuation or any other lever movement.

It is to be understood that the invention is not limited to the constructional details above referred to. For instance, only one bucket shaped member may be used if desired for modifying the leverage moment or otherwise. Again the stops will have different effects if placed on the bus bar or the permanent anchorage. The stops for the inner bucket can be carried on the outer bucket, the bus bar or the permanent anchorage and will have different effects according as they are positioned.

Having now described my invention, what I claim as new and desire to secure by Letters Patent is:—

1. A lever and link actuating system for use preferably in connection with an epicyclic change speed gear, comprising in combination a double armed lever on a fulcrum, a free ended spring element anchored at its other end and arranged around an axis along which it exerts a thrust, a link member extending between the free end of said spring element and one arm of the double armed lever, which link member comprises an inner and outer bucket member movable relatively to one another and between stops, and means for rocking the double armed lever on its fulcrum so that the line of thrust will vary the position of its free end in relation to said fulcrum, thereby producing a variable leverage moment.

2. A lever and link actuating system for use preferably in connection with an epicyclic change speed gear, comprising in combination a double armed lever on a fulcrum, a free ended spring element anchored at its other end and arranged around an axis along which it exerts a thrust, a link member extending between the free end of said spring element and one arm of the double armed lever, which link member comprises an inner and outer bucket member movable relatively to one another and between stops, the outer bucket member having a knife edge support on a part of one arm of the said double armed lever, and the inner bucket member being adapted to swing free in the outer bucket, stops being provided to allow limited movement between the parts, and means for rocking the double armed lever on its fulcrum so that the line of thrust will vary the position of its free end in relation to said fulcrum, thereby producing a variable leverage moment.

In testimony whereof I have signed my name to this specification.

WALTER GORDON WILSON.